US011170386B2

(12) United States Patent
Meszaros

(10) Patent No.: US 11,170,386 B2
(45) Date of Patent: Nov. 9, 2021

(54) ENVIRONMENTAL TELEMETRY SUPPLY CHAIN SYSTEM

(71) Applicant: Accenture Global Solutions Limited, Dublin (IE)

(72) Inventor: Richard T. Meszaros, Westworth Village, TX (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/713,915

(22) Filed: Dec. 13, 2019

(65) Prior Publication Data

US 2020/0279273 A1 Sep. 3, 2020

Related U.S. Application Data

(60) Provisional application No. 62/811,783, filed on Feb. 28, 2019.

(51) Int. Cl.
*G06Q 30/00* (2012.01)
*G06F 16/901* (2019.01)
(Continued)

(52) U.S. Cl.
CPC ....... *G06Q 30/0185* (2013.01); *G05B 19/042* (2013.01); *G06F 16/901* (2019.01);
(Continued)

(58) Field of Classification Search
CPC .... G06Q 30/0185; G06Q 50/28; G06Q 10/08; G06F 16/901; G05B 19/042; G05B 2219/2614; G06K 19/07758
See application file for complete search history.

(56) References Cited

U.S. PATENT DOCUMENTS 8,392,339 B2 3/2013 Kraft
2005/0126189 A1* 6/2005 Salama .................. G06Q 10/08
62/126
(Continued)

FOREIGN PATENT DOCUMENTS

WO WO 2017/027648 A1 2/2017

OTHER PUBLICATIONS

Extended European Search Report dated Apr. 20, 2020, pp. 1-8, issued in European Patent Application No. 20 155 437.5, European Patent Office, Munich, Germany.
(Continued)

*Primary Examiner* — Jan P Mincarelli
(74) *Attorney, Agent, or Firm* — Crowell & Moring LLP

(57) ABSTRACT

A system may receive an item identifier and a container identifier, the item identifier being, for example, encoded in a RFID tag affixed to a physical item and the container identifier being, for example, encoded in an RFID tag affixed to a container. The system may identify, on a blockchain, an item smart contract based on the item identifier and a container smart contract based on the container identifier. The item smart contract may include environmental compliance criteria for the physical item. The system may store, on the blockchain, a mapping between an item smart contract and the container smart contract. The system may receive environmental status information derived from sensor data generated by a sensor affixed to or in the container. The system may determine the environmental status information of the container does not satisfy the environmental compliance criteria included in the item smart contract.

19 Claims, 6 Drawing Sheets

(51) Int. Cl.
*G05B 19/042* (2006.01)
*G06K 19/077* (2006.01)
*G06Q 50/28* (2012.01)

(52) U.S. Cl.
CPC ....... *G06K 19/07758* (2013.01); *G06Q 50/28* (2013.01); *G05B 2219/2614* (2013.01)

(56) References Cited

U.S. PATENT DOCUMENTS

| | | | |
|---|---|---|---|
| 2016/0217399 A1 | 7/2016 | Roelofs et al. | |
| 2018/0144298 A1 | 5/2018 | Rankin | |
| 2018/0220278 A1 | 8/2018 | Tal et al. | |
| 2019/0266613 A1* | 8/2019 | Cantrell | G06K 19/0717 |
| 2020/0051015 A1* | 2/2020 | Davis | G06Q 10/0833 |
| 2021/0009310 A1* | 1/2021 | Moeller | G06Q 10/08 |

OTHER PUBLICATIONS

"SAP Transportation Management," dated Jun. 2015, pp. 1-52, published by SAP Americas, SAP SE, Newtown Square, PA.

"SAP Transportation Management 9.3, Using SAP NetWeaver 7.4," Master Guide, Document version 1.2—Jan. 21, 2016, dated Jan. 21, 2016, pp. 1-38, published by SAP Americas, SAP SE, Newtown Square, PA.

Frederic Vedrunes, "A Peer-to-Peer Transportation System of Objects," Revision 2.1, dated Mar. 31, 2017, pp. 1-5, published by PassLfixat URL https://pacifics.org/whitepaper.

"Case Study 3: Chain of Shipping," Chain of Things, dated Jan. 1, 2016, pp. 1-12, published by Chain of Things Limited, Hong Kong, China.

Nicola Nel, "Rise of the Smart Port: A Case for Blockchain Technology?", dated Jul. 30, 20107, pp. 1-2, published online by Bowmans at URL https://www.bowmanslaw.com/insights/fintech/rise-smart-port-case-blockchain-technology.

* cited by examiner

Item Smart Contract States

Container Smart Contract States

ENVIRONMENTAL TELEMETRY SUPPLY CHAIN SYSTEM

CROSS REFERENCE TO RELATED APPLICATIONS

This application claims the benefit of U.S. Provisional Application No. 62/811,783 filed Feb. 28, 2019, which is incorporated by reference herein in its entity.

TECHNICAL FIELD

This disclosure relates to supply chain and logistics systems and, in particular, supply chain information technology and blockchain

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
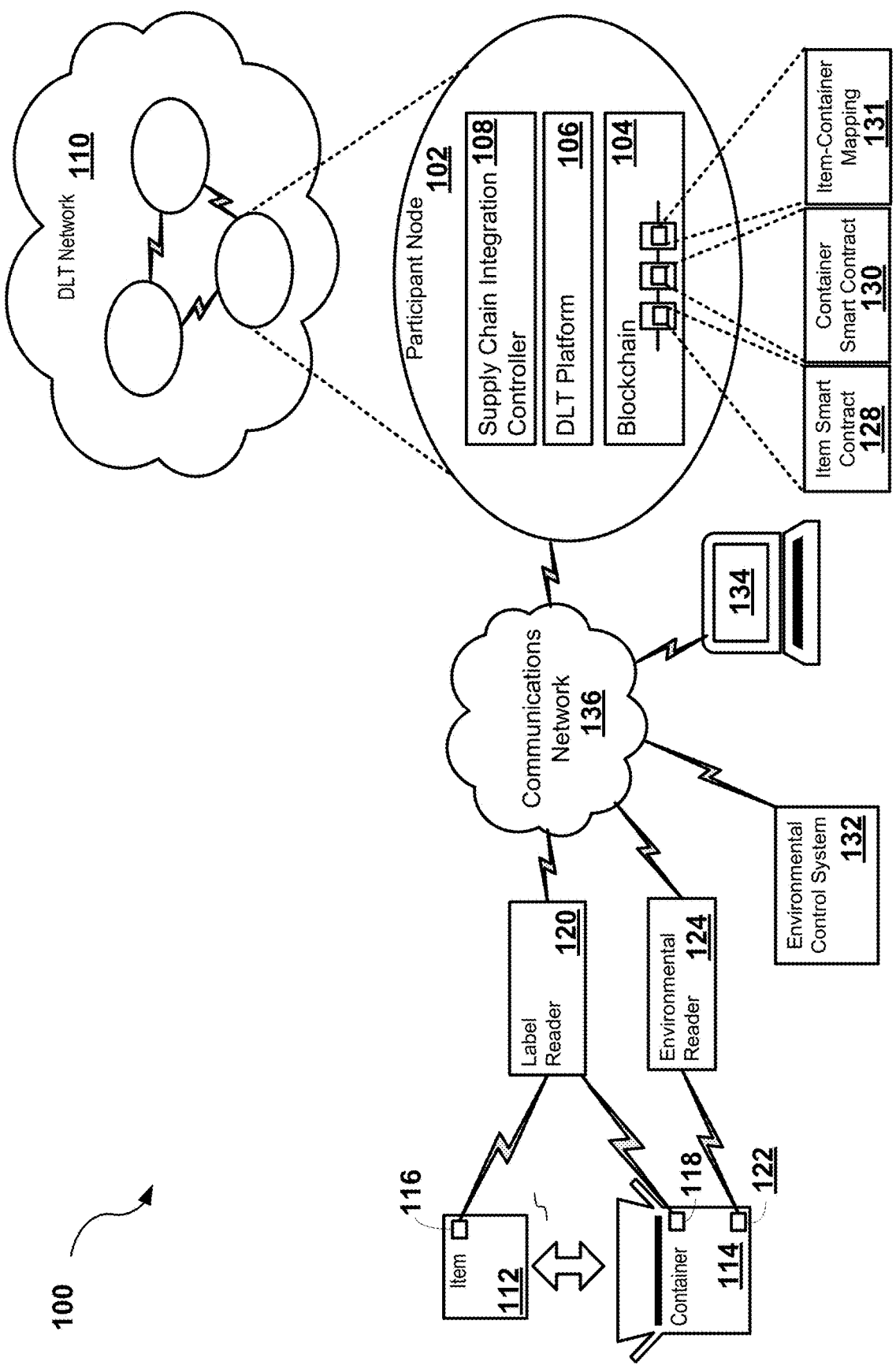
FIG. 1 illustrates a first example of a system.

Tracking product information from manufacturer to consumer may involve multiple participants. Carriers, owners, custodians, or other participants of the supply chain may use siloed systems for managing different portions of the supply chain. During a product's journey through a supply chain, large amounts of data regarding the product's lifecycle may be generated and stored in isolated locations according to proprietary formats. Product information detailing the logistical shipping, storing, compliance and/or selling of products may be unavailable or incomplete, depending on where or when the information is accessed.

Furthermore, products being handled within the supply chain may be exposed to unfavorable environmental conditions that may compromise the products. Traditional approaches to supply chain management fail to provide an end-to-end system for telemetrically tracking environmental conditions. Moreover, traditional approaches fail to provide auditable histories of detected environmental conditions, remediation attempts, and custody transfers across and/or between multiple custodians.

Accordingly, there is disclosed digital systems and methods for managing a distributed supply chain based on environmental telemetry. By way of introductory example, a system may receive an item identifier and a container identifier, the item identifier being encoded in a first tracking label affixed to a physical item and the container identifier being encoded in a second tracking label affixed to a container. In some examples, the first tracking label and/or the second tracking label may include radio-frequency identification (RFID tags) affixed to the physical item and the container, respectively.

The system may identify, on a blockchain, an item smart contract based in the item identifier. The item smart contract may include environmental compliance criteria for the physical item. The system may identify, on the blockchain, a container smart contract based on the container identifier. The system may store, on the blockchain, a mapping between an item smart contract and the container smart contract. The system may receive environmental status information derived from sensor data, the sensor data being previously generated by a sensor affixed to the container. The system may determine, in response to the item smart contract being mapped to the container smart contract, the environmental status information for the container does not satisfy the environmental compliance criteria included in the item smart contract. The system may store, on the blockchain, an item state for the item smart contract, the item state being indicative of the environmental compliance criteria not being satisfied.

An example of a technical advancement provided by the systems and methods described herein is an ecosystem for tracking the lifecycle of an item (food, medicine, product, etc.) from manufacturer to consumer to establish authenticity in an immutable manner using blockchain. For example, the system may accept labeling information encoded in a tag or label for an item and store labeling information on the blockchain. Technologies for providing the labeling information may include radio-frequency identification (RFID), quick response (QR) code, near field communication (NFC) tag, internet-of-things sensor (IoT), bar code, or other technologies, which provide encoded information to scanning devices. Alternatively or in addition, a unique value may be generated based on a mapping algorithm and input data representative of the item. For example, the mapping algorithm may include a hash function. The hash function may receive an image of the item and output a unique hash value, which can be used to verify the authenticity of the item.

Alternatively or in addition, a technical advancement provided by the system and methods described herein may involve mappings between smart contracts to establish item aggregation (e.g., items being put in a container for shipment), disaggregated (e.g., taking items from a container) and/or multi-level aggregations (e.g., a subset of the items being placed in first containers and mixed with other items and being placed into a second container). For example, each item and/or container may be tokenized with a unique smart contract that includes parameters and logic for the item and/or container. Item smart contract(s) may be mapped to container smart contract(s) to signify aggregation. The item smart contract(s) may be unmapped from the container smart contract(s) to signify disaggregation. The mapping (and unmapping) may be tracked in immutable transactions stored on the blockchain.

Alternatively or in addition, a technical advancement achieved by the systems and methods described herein is the use of smart contracts that may govern compliance criteria regardless of the custodian that is responsible for a physical item. For example, environmental information (e.g. temperature, relative humidity, etc) may be reported by sensor(s) attached to the container. A smart contract for the container may include logic to record the environmental information on the blockchain. A smart contract for the physical item may include logic to determine whether the environmental information complies with a pre-established criteria. The storage of the environmental information on the blockchain and/or the evaluation of the criteria may, is some examples, only occur when a mapping between the item smart contract and the container smart contract is established on the blockchain. Accordingly, the storage space and processor utilization may be preserved for only those items that are in transit.

The smart contracts for products and/or container may be validated and replicated across multiple nodes of a distributed ledger. The smart contracts may define how information is to be obtained, tracked, stored, formatted, and/or analyzed for compliance. For example, smart contracts may specify the labels and/or states, associated with items and/or package containers in a supply chain. The systems and methods herein may apply to a supply chain for any product, such as food, medicine, chemicals, products, raw materials or any other product. Additional or alternative technical advancements are made evident in the system and methods described herein.

FIG. 1 illustrates an example of a system 100. The system 100 may include a participant node 102. The participant node 102 may include a blockchain 104, a DLT platform 106, and a supply chain integration (SCI) controller 108.

The blockchain 104 may include datablocks that are linked according to a cryptography. The datablocks of the blockchain 104 may include a genesis datablock that is the initial datablock of the blockchain 104. Successive datablocks may be appended to the blockchain 104 over time. The blockchain 104 may provide a chronological ledger of information where one or more of the successive datablocks may include a hash of a previous datablock, a hash of a header of the previous datablock, and/or a hash of portions of the previous datablock. Thus, information is appended to the blockchain 104 by adding one or more datablocks to the blockchain 104. By design, a blockchain is resistant to modification of the data. Modifications to one or more datablocks in the blockchain 104 may cause inconsistencies in the hashed information stored in the successive datablocks. The inconsistencies may indicate malicious and/or corrupt information stored on the blockchain 104. The arrangement of datablocks and associations between information stored in the datablocks are established by a distributed ledger technology (DLT).

The DLT platform 106 may include a framework that causes the blockchain 104 to maintain a full or partial replication of other blockchains stored by participants of in a distributed ledger network 110. The DLT platform 106 may implement and/or validate the blockchain 104 based on consensus among participant nodes of the distributed ledger network 110. The participant node 102 may locally implement an instance of the DLT platform 106. The local instance of the DLT platform 106 may communicate with other DLT platform instances. For example, the DLT platform 106 may cause the participant node 102 to synchronize changes to the blockchain 104 with remote blockchain(s) on other participant nodes such that each participant node includes update-to-date blockchains. Alternatively or in addition, the DLT platform 106 may provide user interfaces, application programming interfaces (APIs), services related to management of the blockchain 104 (or blockchains). Examples of the DLT platform 106 may include Hyperledger, Ethereum, and/or other custom developed implementations.

The distributed ledger network 110 may include a peer-to-peer network of multiple participant nodes that respectively communicate based on a consensus protocol to access, submit, modify, and/or remove information stored on local instances of the blockchain 104. For example, each of the participant nodes may include a full or partial copy of the blockchain 104 (e.g. a local blockchain). The participant nodes of the distributed ledger network 110 may submit transactions to local instances of a DLT platform. A consensus protocol shared between the participant nodes of the distribute ledger network determine whether to append the transaction to local instances of the blockchain 104. The consensus protocol may prevent modification to previously appended or existing information in the blockchain 104. In some DLT platforms, modifications to the blockchain 104 may be prohibited unless a majority, or some other predefined portion, of the participant nodes consent to the modifications.

The SCI controller 108 may track, manage, and/or control the shipment(s) of physical item(s) 112 and container(s) 114. The SCI controller 108 may include a command interface for procedural calls, messages and/or other invokable commands. Alternatively or in addition, the SCI controller 108 may provide an interface for accessing current and/or historical information related to the physical items and/or containers in a supply chain. In some examples, the SCI controller 108 may include an interface for creating new physical items and containers based on user input, viewing historical information, allocating labels for the physical items(s) 112 and/or containers (114), allocating or executing smart contracts for the physical item(s) 112 and/or container(s) 114, and/or performing other operating as described herein. In some examples, the SCI controller 108 may generate graphical user interface(s) for receiving input parameter for invoking various operations of the SCI controller 108.

The physical item 112 may include a physical object that is transported, shipped, and/or processed in a supply chain. For example, the physical item 112 may include a good, or multiple goods packaged together. In various examples, the physical item 112 may be transferred between multiple containers during shipment of the physical item 112. Alternatively or in addition, the physical item 112 may be a first container, which is packaged inside a second container.

The container 114 may include a structure that contains one or more physical item(s) for shipping. For example, the container 114 may include a box, crate, or a dry storage container, a flat rack container, an open top container, a pallet, an open side storage container, a double door container, a refrigerated container, an insulated or thermal container, a tank, an intermediate bulk container, a drum, or other special purpose containers.

The SCI controller 108 may receive information related to the location, custody, and other status information for the physical item 112 and/or the container 114 in a supply chain. For example, the SCI controller 108 may receive label information scanned, detected, or otherwise encoded in a tracking label 116 for the physical item 112 and a tracking label 118 for the container 114.

In general, a tracking label may include an object that stores encoded information. For example, a tracking label may include an electromagnetic label, such a radio-frequency identification (RFID) label, a near field communication (NFC) tag, and/or a label that actively or passively provides encoded information via electromagnetic signals. Alternatively or in addition, a tracking label may include an image-based label wherein formation is encoded into a visible image. For example, the tracking label may include a bar code, a matrix bar code (i.e. Quick Response (QR) code), and/or a label that provides encoded information in the form of an image.

The tracking label 116 for the physical item 112 (item tracking label, hereafter) may be included on or in the physical item 112. For example, the tracking label 116 may be affixed to and/or disposed inside the physical item 112. Alternatively, the item tracking label 116 may be affixed to or included on an exterior of the physical item 112 or some other location on the physical item 112. For example, the item tracking label 116 may be affixed to the exterior surface of the physical item 112 or integrated (i.e. printed) onto the exterior surface of the physical item 112.

The tracking label 118 for the container 114 (container tracking label, hereafter) may be included on or in the container 114. For example, the container tracking label 118 may be affixed to and/or disposed, or partially disposed, inside container, separate from the physical item(s) inside the container 114. Alternatively, the container tracking label 118 may be affixed to or included on an exterior of the container 114 or some other location on the container 114. For example, the container tracking label 118 may be affixed to the exterior surface of the container 114 or integrated (i.e. printed) onto the exterior surface of the container 114.

Table 1 provides an example of information included in the item tracking 116 label and/or container tracking label 118.

TABLE 1

Label Information

| | |
|---|---|
| Label Identifier | A unique identifier of a physical item or container. |
| Smart Contract Identifier | Identifiers and/or addresses of a smart contract on a blockchain representative of the physical item or container |
| Blockchain Identifier | An identifier of a blockchain. |
| Environmental compliance criteria | Thresholds, ranges, and/or operators for defining acceptable or non-acceptable environmental conditions. |

The information described in Table 1 is provided as an example. In various examples, the item tracking label 116 and/or the container tracking label 118 may include additional or alternative information.

In some examples, the system 100 may include a label reader 120. The label reader 120 may include a device, or logic for a device, that detects information encoded in the tracking label(s). For example, the label reader 120 may include electromagnetic signal reader, such as a radio-frequency identification (RFID) scanner, a near field communication (NFC) tag reader, and/or a device that detects electromagnetic signals emitting from tracking label(s). Alternatively or in addition, the label reader 120 may include an image sensor, such as a camera, that captures image-based labels. For example, the label reader 120 may include a bar code scanner, a matrix bar code scanner, and/or any other image capture device.

In some examples, an environment sensor 122 may be affixed to, or included in, the container 114. An environment sensor 122 may include a sensor that generates sensor data comprising measured physical properties. The environmental sensor may include, for example, a thermocouple, a hydrometer, a barometer, a light sensor, and/or any other sensor. The environmental sensor may measure environmental conditions within and/or external to the container 114. The environmental conditions may include, for example, temperature, relative humidity, light intensity, atmospheric pressure, vibration, angular momentum and/or other in side of, or in proximity to the container 114 and/or physical item 112.

The system 100 may include an environmental reader 124. The environmental reader 124 may include a device that receives or captures sensor data generated by one or more environmental sensors. For example, the environmental reader 124 may receive environmental information generated by multiple sensors. In some examples, the environmental reader 124 may convert the sensor data in other messaging formats and/or associate the sensor data. For example, the environmental reader 123 may generate environmental status information.

The environmental status information may include environmental measurements derived from sensor data. Alternatively or in addition, the environmental status information may include identifying information of the container the environmental sensor that generated the sensor data is attached. For example, the environmental status information may include the at least a portion of the label information shown in Table 1. Thus, a receiver of the environmental status information, such as the SCI controller, may attribute environmental measurements to a particular environmental sensor and/or container.

The blockchain 104 may include one or more smart contracts to manage physical item(s) and/or container(s). In general, a smart contract may include logic and information organized under a protocol that facilitates, verifies, and/or enforces the negotiation or performance of an associated agreement between parties and/or the intentions of a single party. The smart contract may include parameters that constitute the definitions and terms of the associated agreement. The smart contract may include rules, instructions, and/or logic that is executable to control, enforce, and carry out the rights and/or the obligations agreed upon by one or more parties. Alternatively or in addition, the smart contract may include executable logic that detects information, performs computer-implemented actions, or responds to events in any way that is proposed or agreed upon between one or more parties.

Updates to information included in a smart contract and/or execution of logic provided by a smart contract may be recorded on the blockchain 104 via one or more transaction. Thus, when a parameter of a smart contract is updated, the previous value and/or the updated value for the parameter may be stored on the blockchain 104 along with tracking information including, for example, version information, time stamp information, and, other relevant information for tracking the transaction. Accessing parameters of a smart contract may involve retrieving the latest value for that parameter on the blockchain. The latest value may be the last update made to the parameter.

In some examples, the SCI controller 108 may access, create, and/or execute logic included in an item smart contract 128 and/or a container smart contract 130. The item smart contract 128 may represent the physical item 112. The container smart contract 130 may represent the container 114. As described herein, the blockchain may store, among other information, the item smart contract 128, a container smart contract 130. Updates to the item smart contract and/or the container smart contract may be recorded and tracked in successive transactions stored on the blockchain.

In some examples, the SCI controller 108 may access and/or create an item-container mapping 131. The item-container mapping may represent a relationship between the item smart contract 128 and the container 114 smart contract. For example, the item-container mapping may include an identifier of the item smart contract 128 and an identifier of the container smart contract 130. Alternatively or in addition, the item-container mapping may include an identifier of the physical item 112 and the container 114. The item-container mapping may be represented in various data structures including, for example a table, a list, or other suitable data structures. In some examples, the item-container mapping may include a one to many association between a container and multiple physical items. For example, the item-container mapping may represent a container being packed with multiple physical items.

The item smart contract 128 may include parameters descriptive of the physical item and/or logic to manage and/or track the physical item 112. Table 2 illustrates an example of the item smart contract 128.

TABLE 2

Item Smart Contract

| Parameters | |
|---|---|
| Smart Contract Identifier | An identifier of the item smart contract. |
| Item Label Identifier | An identifier of the item. |
| Environmental Compliance Criteria | A criteria for determining environmental compliance (e.g. acceptable temperature ranges, humidity ranges, etc). |
| Item-Container Mapping | A mapping between an item smart contract a container smart contract. |
| Item State | A state of a physical item (i.e. created, packed, unpacked, out of compliance, etc) |
| Location | The geographic or descriptive location of a physical item. |
| Custody Information. | The current custodian of a physical item. |
| Recipient Address | Recipient addresses for notifications, alerts and/or status updates regarding the item. |
| Custody In/ Custody Out Time(s) | Date and/or times values signifying when the item changed custody. |
| Material Classification | Classification of the material of the item (i.e. biohazardous, flammable, etc.). The material classification may follow a standardized classification hierarchy. |
| Logic | |
| Environment Compliance Logic | Logic to determine whether the current environment of a physical item satisfies environmental compliance criteria. |
| Item Packing Logic | Logic to generate a mapping between the item smart contract and container smart contract. |

The item smart contract 128 may include additional or alternative information than what is described in Table 2. Moreover, the item smart contract 128 may be defined in other data structures and formats, such as eXtensible Markup Language, JavaScript Object Notation, or other relevant structures. In some examples, changes to any of the information stored in the item smart contract 128 may be recorded on a transaction on the blockchain 104. For example, changes to the location, custody, item state, or other information included in the item smart contract 128 may be appended to the blockchain 104. Thus, the parameters and/or logic included in the item smart contract 128 may reflect the recent information stored on the blockchain 104 or in an off-chain cache (not shown in FIG. 1). The blockchain 104 may provide a historical log of the parameters and logic of the smart contract, and changes thereto.

The environmental compliance criteria may include criteria for acceptable (or unacceptable) environmental status of the physical item 112. For example, the environmental compliance criteria may a numerical threshold, upper/lower bounds of a numerical range, or comparisons between thresholds and/or values. The environmental compliance criteria may establish acceptable (or unacceptable) temperature conditions, humidity conditions, lighting, atmospheric pressure, and/or other types of physical conditions exposed to the physical item 112.

The environmental compliance logic may include executable logic to determine whether an input measurement of the environment of the package satisfies the environmental compliance criteria. For example, execution of the environmental compliance logic may compare the environmental compliance criteria with environmental measurements (for example measurements generated by the environment sensor 122). By way of example, the following psuedo logic includes an example of an environmental compliance logic: IF X>20° C. {RETURN TRUE} ELSE {RETURN FALSE} where X>20° C. is the environmental compliance criteria, 20° C. is a predetermined threshold for temperature, X is an input temperature. In the foregoing example, when a temperature measurement of 25° C. is obtained, the environmental compliance criteria is not satisfied. When a temperature measurement of 15° C. is obtained, the environmental compliance criteria is satisfied.

In some examples, the environmental compliance logic may include executable logic to update the item state. For example, the environmental compliance logic may set the item state of the smart contract to an item state that indicates compliance or non-compliance (see FIG. 4).

The item packing logic may include logic to record an event of the physical item 112 being packed in the container 114. For example, an input parameter for the item packing logic may include an identifier of the container smart contract and/or the container 114. Execution of the item packing logic may generate and/or store a transaction on the blockchain 104 including the item-container mapping 131. The item packing logic may submit transactions to the blockchain 104 to record changes the item-container mapping 131 and/or to associate item-container mapping 131 with the item smart contract 128. Thus, multiple transactions may related to item-container mappings may provide a historical log of the physical item 112 is inserted into the container(s) and/or transferred between containers.

The container smart contract 130 may include logic and/or parameters to manage and/or track the container 114. Table 3 illustrates an example of the container smart contract 130.

TABLE 3

Container Smart Contract

| Parameters | |
|---|---|
| Smart Contract Identifier | An identifier of the container smart contract. |
| Container Label Identifier | An identifier of the container. |
| Item-Container Mapping | A mapping between item smart contract(s) and a container smart contract. |
| Container State | A state of a physical item (i.e. packed, unpacked etc) |
| Location | The geographic or descriptive location of a physical item. |
| Custody Information | The current custodian of the container. |
| Recipient Address | Recipient addresses for notifications, alerts and/or status updates regarding the container. |
| Custody In/ Custody Out Time(s) | Date and/or times values signifying when the packaged changed custody. |
| Material Classification | Classification of the material of the package or items in the package (i.e. biohazardous, flammable, etc.). The material classification may follow a standardized classification hierarchy. |
| Logic | |
| Environmental Tracking Logic | Logic to receive, process, and store environmental measurements for the container on the blockchain. |
| Container Packing Logic | Logic to generate a mapping between item smart contract(s) and the container smart contract. |
| Custody Tracking Logic | Logic to track the custody of the container and physical items included in the container. |

The container smart contract 130 may include additional or alternative information than what is described in Table 3. Moreover, the container smart contract 130 may be defined in other data structures and formats, such as eXtensible Markup Language, JavaScript Object Notation, or other relevant structures. In some examples, changes to any of the information stored in the container smart contract 130 may be recorded in a transaction and stored on the blockchain 104. For example, changes to the location, custody, item state, or other information included in the container smart contract 130 may be appended to the blockchain 104. Thus, the parameters and/or logic included in the container smart contract 130 may reflect the recent information stored on the blockchain 104 or in an off-chain cache (not shown in FIG. 1). The blockchain 104 may provide a historical log of the parameters and logic of the container smart contract 130, and changes thereto.

The environmental tracking logic may include logic to receive and/or store one or more environmental measurement on the blockchain 104. For example, the environmental tracking logic may include logic to communicate with an external source, such as the environmental reader 124 and/or the environmental sensor. The environmental tracking logic may receive environmental measurements and store the environment measurement(s) on the blockchain 104 in a transaction. Over time, the blockchain 104 may acquire multiple transactions respectively comprising various environmental measurements at different times. Thus, the environmental measurements may provide a log of historical environmental measurements.

In some examples, the environmental tracking logic may include logic to identify and/or execute the environmental compliance logic of the item smart contract(s) mapped to the container smart contract 130. For example, in response to receipt of an environmental update, the environmental tracking logic may identify one or more item smart contract based on the item-container mapping. The environmental tracking logic may cause execution of the environmental compliance logic of each identified item smart contract.

The container packing logic may include logic to record an event of the physical item(s) being packed in the container. For example, an input parameter for the container packing logic may include an identifier of one or more item smart contract and/or an identifier of one or more physical items. Execution of the packing logic may generate an item-container mapping. In some examples, the item container mapping of the container smart contract 130 may include a one-to-many relationship indicative of a container having multiple packages.

The custody tracking logic may include logic to record an event of the container 114 and/or the physical items changing custody. For example, the custody tracking logic may append, to the blockchain 104, a transaction comprising updates to the custody information of the container smart contract 130. The custody information of the container smart contract 130 may reflect the latest custody information appended to the blockchain 104. The blockchain 104 may include a historical record of changes to the custody information of the container smart contract 130.

Figure 6:
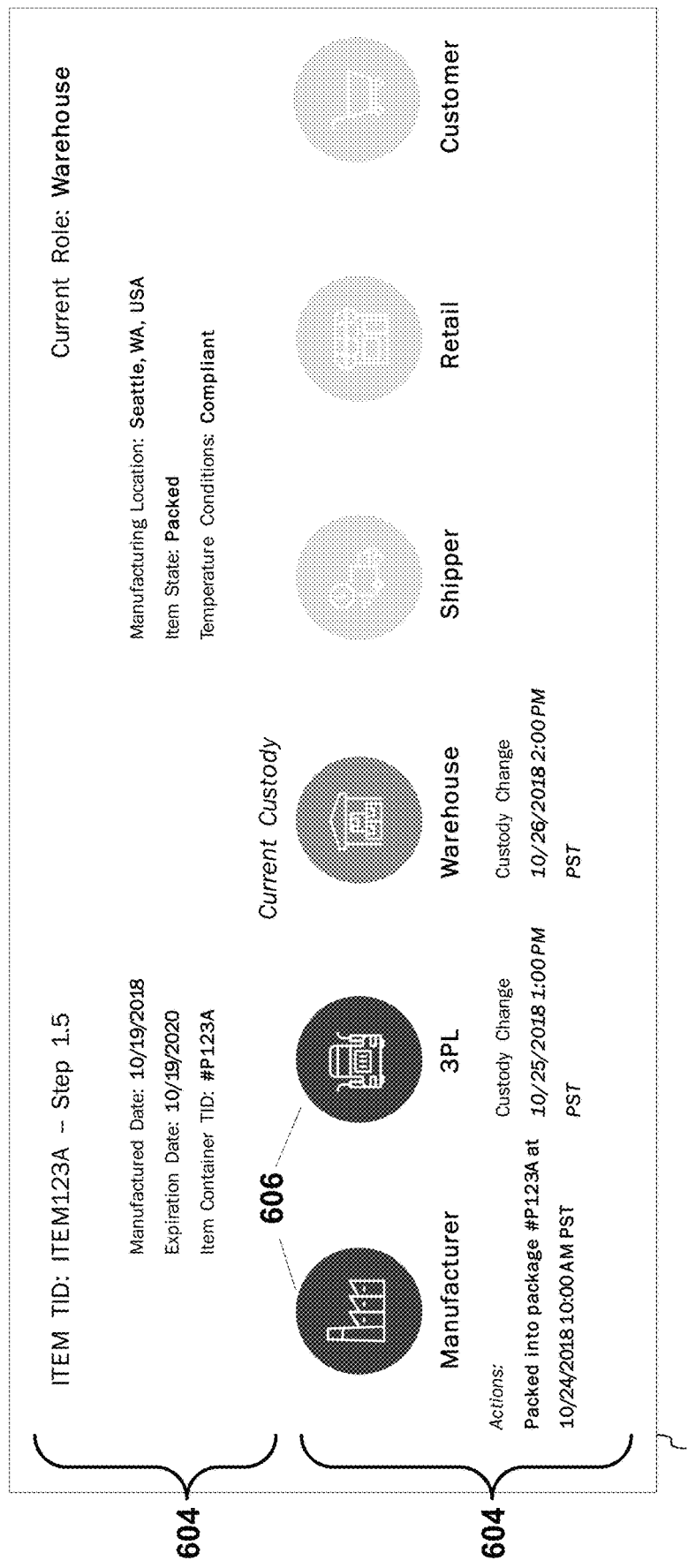
FIG. 6 illustrates an example of a graphical user interface.

In some examples, the custody tracking logic of the container smart contract 130 may update the custody history of each item smart contract mapped with the container smart contract 130. The custody information of the item smart contract 128 may reflect the latest custody information appended to the blockchain 104. The blockchain 104 may include a historical record of changes to the custody information of the item smart contract 128. Historical changes to the custodian information of the item smart contract 128 and/or the container 114 may be shown in a graphical user interface, as shown in FIG. 6.

In some examples, the system 100 may include an environmental control system 132. The environmental control system 132 may include system that adjusts the environmental properties (i.e. temperature, humidity, etc) that the container 114 and/or the physical item 112 are exposed to. For example, the environmental control system 132 may include a heating, ventilation, and air condition system (HVAC) system. Alternatively or in addition, the environmental control system 132 may include any system that can change the temperature, relative humidity, lighting, atmospheric pressure, and/or any other environmental characteristic in a space in which the physical item 112 and/or container 114 are located. The environmental control system 132 may receive an instruction to change the environmental characteristics. For example, the environmental control system 132 may receive an instruction with a target parameter, such as a target temperature, a target relative humidity, etc. The environmental control system 132 may respond to the instruction my adjusting the environmental character characteristic(s) to reflect the target parameter.

The system 100 may include a terminal device 134. The terminal device 134 may include a device that displays graphical user interface(s) generated by the participant node 102 or other sources. In some examples, the terminal deice may receive scan information generated by the label reader.

The scan information may include label information encoded in the item tracking label 116 and/or the container tracking label 118. The terminal device 134 may communicate the scan information and other information, such as packing requests (see FIG. 2), item/container registration requests (see FIG. 3).

The participant node 102, the label reader 120, the environmental reader 124, the environmental control system 132 and/or the terminal 134 may communicate via communications network 136. The communications network 136 may include a network, such as a local area network, a virtual private network, and/or a wide area network. The network 136 may facilitate communication between the participant node 102, the label reader 120, the environmental reader 124, the environmental control system 132 and/or the terminal 134. The communications network 136 may be separate from the DLT network 110. Alternatively or in addition, the DLT network 110 may include a virtual network within the network 136. For example, the participant nodes of the DLT network 110 may perform peer-to-peer communication over the network 136. Alternatively or in addition, each participant node of the DLT network 110 may communicate over a separate corresponding network in which label readers, environmental readers, environmental control systems and/or terminals are connected.

The system 100 may be implemented in many ways. In some examples, the participant node 102 may include the label reader, the environmental reader 124, the environmental control system 132 and/or the terminal. Alternatively or in addition, the system may include the participant node 102 without the environmental reader 124, the environmental control system 132 and/or the terminal.

Figure 2:
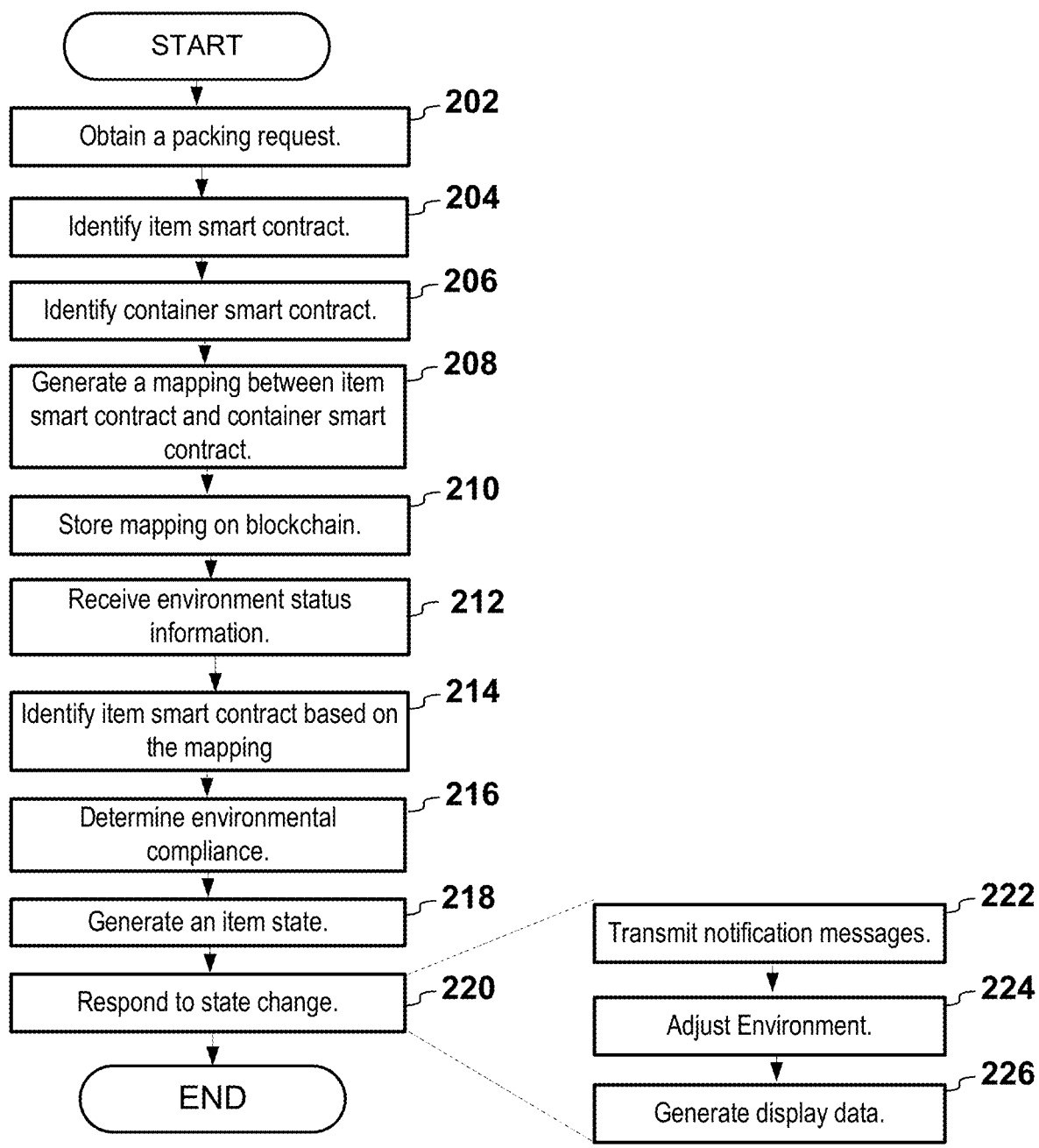
FIG. 2 illustrates a first example of a flow diagram for logic of a participant node.

FIG. 2 illustrates an example of a first flow diagram for logic of the participant node 102. Reference to FIG. 1 is made throughout the following discussion of FIG. 2.

The participant node 102 may obtain a packing message (202). The packing message may include a request to pack the physical item 112 in the container 114. Alternatively, the packing message may include a confirmation that the physical item 112 is packed in the container 114. In some examples, the packing message may include label information scanned from a tracking label. By way of example, the label reader 120 may scan the item tracking label 116 and/or the container tracking label 118. The label information obtained from scanning may be sent to the terminal device 134. The terminal device 134 may generate the packing request and send the packing request to the SCI controller 108 via API call, messaging broker, or the like. The SCI controller 108 may extract label information from the packing request. For example, the SCI controller 108 may extract an identifier of the physical item 112 and an identifier of the container 114. In various examples, the label reader 120 may instead generate the packing request in addition to (or alternative to) the terminal. For example, the label reader 120 may communicate the packing request to the participant node 102.

In examples, where the tracking labels are RFID based, the label reader 120 may perform a scan in one area to generate the packing request. For example, the label reader 120 may detect the tracking labels of the container 114 and multiple physical items included in the container 114. The packing request may include label information from the container tracking label 118 and the item tracking labels included in the container 114.

The participant node 102 may identify one or more item smart contract(s) (204). For example, the label information acquired from the packing request and/or item tracking label 116 may include an item identifier, a smart contract identifier, or some other identifying information that may used to identify the item smart contract 128. The SCI controller may search the blockchain 104 based on the item identifier to identify the item smart contract 128.

The participant node 102 may identify one or more container smart contracts (206). For example, the label information acquired from the packaging request and/or container tracking label 118 may include a container identifier, a smart contract identifier, or identifying information of the container smart contract 130 and/or the container 114. The SCI controller 108 may search the blockchain 104 based on the container tracking label 118 information to identify the container smart contract 130.

The participant node 102 may generate an item-container mapping between the item smart contract 128 and the container smart contract 130 (208). For example, the SCI controller 108 may access the packing logic included in the item smart contract 128 and/or the container smart contract 130. The SCI controller 108 execute the packing logic included in the item smart contract 128 and/or the item smart contract 128 to generate an item-container mapping.

The participant node 102 may store the item-container mapping on the blockchain 104 (210). For example, the DLT platform 106 may submit a transaction including the item-container mapping to a consensus protocol. The transaction may be validated by other participant nodes of the DLT network 110 and appended to the blockchain 104. Other participant nodes may replicate the item-container mapping on their blockchains.

The participant node 102 may receive environmental status information (212). The environmental status information may include, for example, an environmental measurement, an identifier of the container, an identifier of the environmental sensor, etc.

The participant node 102 may identify the item smart contract 128 based on the item-container mapping (214). For example, the environmental data may be associated with a container identifier or a container smart contract identifier. Based on the item-container mapping previously stored on the blockchain 104, the logistical management control may determine that the container smart contract 130 for the container is mapped to the item smart contract 128 for the item. In various examples, the blockchain 104 may include multiple item-container mapping (i.e. the container may have multiple physical items). The SCI controller 108 may search the blockchain 104 for the item smart contract 128 that is associated with the item identifier(s).

The participant node 102 may determine whether the container satisfies environmental compliance criteria (216). For example, the participant node 102 may access the environmental compliance logic included in the item smart contract 128. The participant node 102 may execute the environmental compliance logic. For example, the SCI controller 108 invoke or cause execution of the environmental compliance logic. Execution of the environmental compliance logic may include accessing the environmental status information comparing an environmental measurement with the environmental compliance criteria included in the item smart contract 128.

Figure 4:
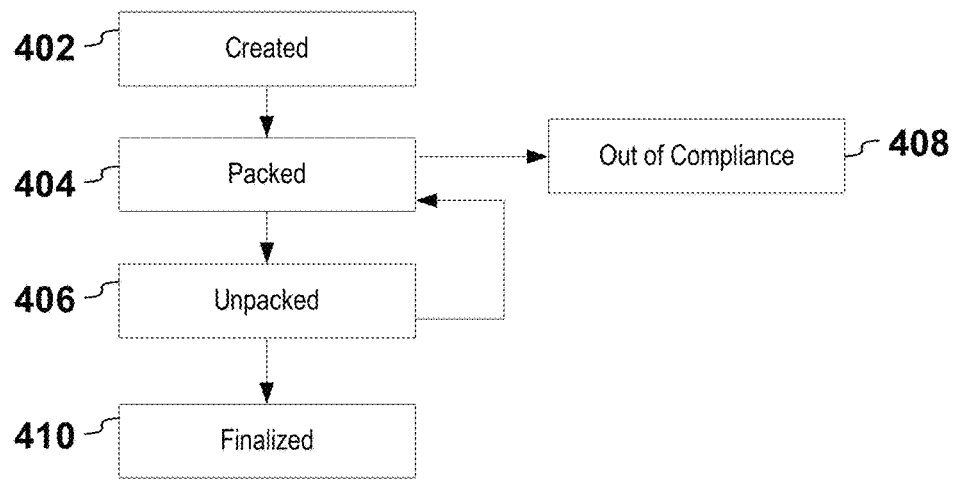
FIG. 4 illustrates an example of states for an item smart contract.

The participant node 102 may generate an item state (218). For example, in response to satisfaction of the environmental compliance criteria, the environmental compliance logic may generate an item state indicative of the environmental compliance criteria being satisfied. Alternatively, in response to the environmental compliance criteria not being satisfied, the environmental compliance logic may generate an item state indicative of the environmental compliance criteria not being satisfied. Various examples of item states and state-machines for the item smart contract are shown in FIG. 4.

The logistic management control may respond to the item state (220). To respond the to the item state, the SCI controller 108 may execute one or more of operations 222-226.

For example, the SCI controller 108 may transmit a notification message (222). For example, the logistics management control may generate a human-readable message. The human-readable message may include the item state, the environmental status information, the environmental compliance criteria, the item identifier, the container identifier, and/or any other information included in the item smart contract 128 and/or container smart contract 130. In some examples, the notification may be transmitted to one or more user's identified in the container smart contract 130 and/or the item smart contract 128. For example, the User Identification Information may include email addresses, phone numbers, and/or other addressable user contact information.

The SCI controller 108 may adjust an environment condition of the physical item 112 and/or the container (224). For example, the SCI controller may generate, in response to the environmental compliance criteria not being satisfied, an instruction to the environmental control system 132 to cause adjustment of an ambient temperature outside the container, an ambient temperature inside the container, or a combination thereof. The SCI controller may transmit the instruction to the environmental control system.

For example, the SCI controller 108 may send an instruction to the environmental control system 132. The environmental control system 132 may cause a temperature, relative humidity, atmospheric pressure, or other environmental property of the environment in which the container 114 and/or the item 112 are included.

The logistic management control may generate display data (226). The display data may include a graphical user interface. Refer to FIG. 6 and the related discussion for an example of the graphical user interface.

Figure 3:
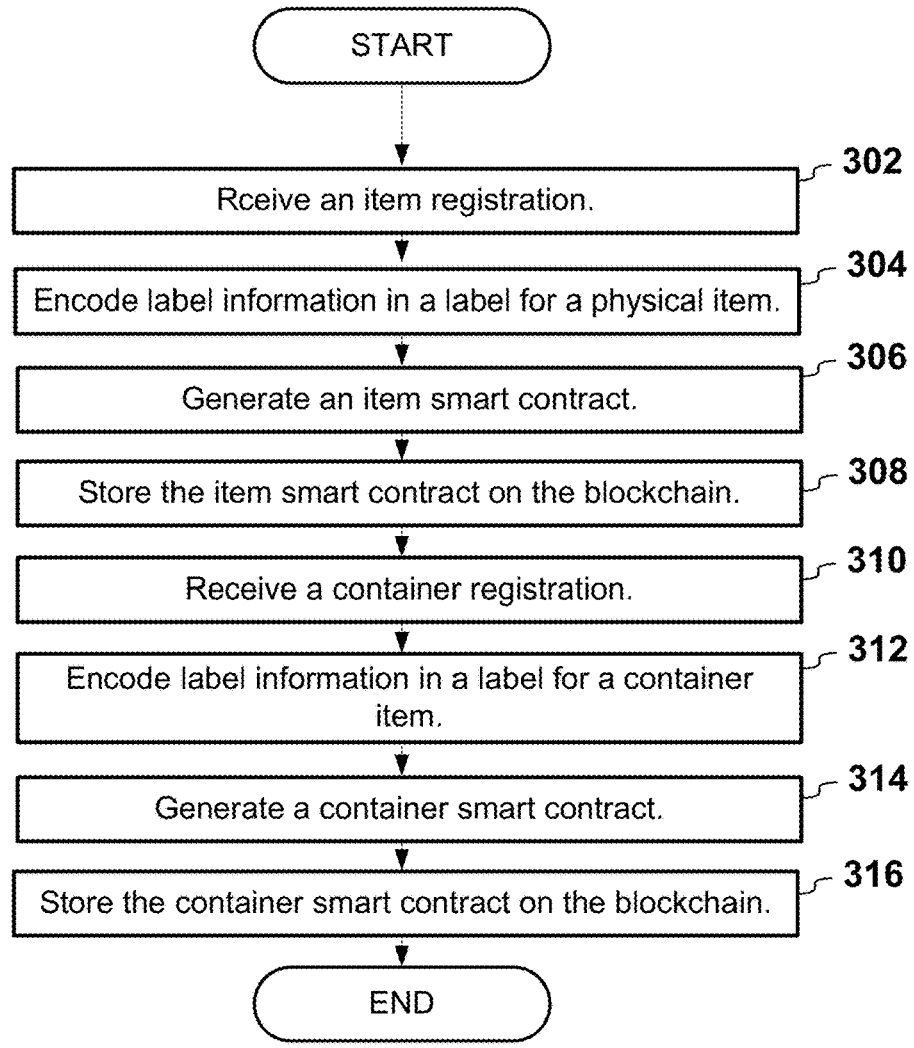
FIG. 3 illustrates a second example of a flow diagram for logic of a participant node.

FIG. 3 illustrates an example of a second flow diagram for logic of the participant node 102. Reference to FIG. 1 is made throughout the following discussion of FIG. 3.

The participant node 102 may receive item registration information (302). The item registration information may include label information to be encoded in the item tracking label 116. For example, the item registration information may include the label information, or a portion thereof, described in Table 1. In some examples, the label reader 120 may acquire label information from the item tracking label 116 on the physical item 112.

In some examples, the SCI controller 108 may generate a user interface for receiving the item registration information, or a portion thereof. The user interface may include various controls and/or forms for entering parameters. For example, the user interface may interactive controls, such as text fields, drops downs, etc. The user interface may include a control of receiving one or more input parameters to be encoded in the item tracking label 116 and/or stored in the item smart contract 128.

The participant node 102 may encode label information in the item tracking label 116 for the physical item 112 (304). For example, the SCI controller 108 may generate the label information based on, for example, input parameters received from a graphical use interface. The SCI controller 108 may generate a matrix bar code, or some other image-based encoding. Alternatively or in addition, the SCI controller 108 may use a binary encoding, or some either relevant encoding, to generate an RFID tag. The generated label in formation may include, by way of example, the information included in Table 1, or a portion thereof.

The participant node 102 may generate the item smart contract 128 (306). For example, the SCI controller 108 may receive the input parameters to include in the item smart contract 128 and/or the item tracking label 116. In some examples, the input parameters may include an environmental compliance criteria, item identifiers, etc. and/or any other information item tracking label 116 and/or the item smart contract 128 (see table 1 and table 2).

The participant node 102 may store the item smart contract 128 on the blockchain 104 (308). For example, the SCI controller 108 may communicate the item smart contract 128 to the DLT platform 106 via, for example, an API invocation or the like. The DLT platform 106 may submit the item smart contract 128 to a consensus protocol to be validated by other participant nodes of the DLT network 110. The DLT platform 106 may append the item smart contract 128 to the blockchain 104.

The participant node 102 may receive container registration information (310). The container registration information may include label information to be encoded in the container tracking label 118. For example, the container registration information may include the label information, or a portion thereof, described in Table 1. In some examples, the label reader 120 may acquire label information from the tracking label on the container.

In some examples, the SCI controller 108 may generate a user interface for receiving the container registration information, or a portion thereof. The user interface may include various controls for entering parameters. For example, the user interface may include interactive controls, such as text fields, drops downs, etc. The user interface may include a control of receiving one or more input parameters to be encoded in the container tracking label 118 and/or stored in the container smart contract 130.

The participant node 102 may encode label information in the container tracking label 118 for the physical item 112 (312). For example, the SCI controller 108 may generate the label information based on, for example, input parameters received from the graphical use interface. The SCI controller 108 may generate a matrix bar code, or some other image-based encoding. Alternatively or in addition, the SCI controller 108 may use a binary encoding, or some either relevant encoding, to generate an RFID tag. The generated label in formation may include, by way of example, the information included in Table 1, or a portion thereof.

The participant node 102 may generate the container smart contract 130 (314). For example, the SCI controller 108 may receive the input parameters to include in the container smart contract 130 and/or the container tracking label 118. In some examples, the input parameters may include any or all of the information shown in Table 2.

The participant node 102 may store the container smart contract 130 on the blockchain 104 (316). For example, the SCI controller 108 may communicate the container smart contract 130 to the DLT platform 106 via, for example, an API invocation or the like. The DLT platform 106 may submit the item smart contract 128 to a consensus protocol to be validated by other participant nodes of the DLT network 110. The DLT platform 106 may append the item smart contract 128 to the blockchain 104.

FIG. 4 Illustrates an example of states for the item smart contract 128. Reference to FIG. 1 is made throughout the following discussion of FIG. 4. The item state for the item smart contract 128 may initially be set to a created state 402. The created state 402 may represent a state where the item smart contract 128 and the item tracking label 116 are created. During this state, the item tracking label 116 may be affixed to the physical item 112, but the item may be outside of any container.

The item state may transition from the created state 402 to the packed state 404. The packed state 404 may represent the physical item 112 being placed or packaged inside the container 114. To transition to the packed state 404, the SCI controller 108 may invoke the packing logic of the item smart contract 128. Packing logic may generate an item-container mapping indicative of the physical item 112 being stored in the container 114. The packing logic may generate item state information indicative of the item smart contacting being set to the packed state 404. Moreover, the packing logic may append the item-container mapping and/or the updated state information to the blockchain 104.

The item state may transition from the packed state 404 to the unpacked state 406, and vis versa. For example, as the physical item 112 is transferred between containers, the SCI controller 108 may execute the corresponding packing logic of the item smart contract 128 to update the item-container mapping. In some examples, execution of the packing logic may cause the container 114 to be unmapped to the item. A transaction may be added to the blockchain 104 indicated of the container 114 being unmapped to the physical item 112. In addition, the packing logic may append, to the blockchain 104, updated state information to the blockchain 104. The updated state information may indicate that the item state has transitioned to the unpacked state 406.

The item state may transition from the packed state 404 to the out of compliance state 408. To transition to the out of compliance state 408, the SCI controller 108 may receive environmental status updates from the environmental reader 124. The environmental status updates may include environmental measurements. The environmental measurements may be derived from sensor data acquired from the environmental sensor affixed to the container 114. In some examples, the environmental status information may include a container identifier and/or a container smart contract 130 identifier or other index/key information that identifies the container smart contract 130. The SCI controller 108 may identify the container smart contract 130 based on the identifying information included in the environmental status information. Alternatively or in addition, the SCI controller 108 may identify one or more item-container mapping, such as the item-container mapping included in the container smart contract 130. Thus, based on the item-container mapping, the SCI controller 108 may access the item smart contract 128.

The SCI controller 108 may execute the environmental compliance logic included in the item smart contract 128. The environmental compliance logic may determine whether or not one or more environmental measurement included in the environmental status information satisfies environmental compliance criteria. In response to the environmental compliance criteria not being satisfied, the SCI controller 108, based on execution of the environmental compliance logic, may transition the item state to the out of compliance state 408.

In some examples, when the physical item 112 is sold, or otherwise disposed of, the SCI logic may transition the item smart contract 128 to a finalized state 410. The finalized state 410 may representative of a state in which the item is no longer being tracked. Execution of the environmental compliance logic, the packing logic, or other logic of the smart contract may be prohibited in response to the item state being set to the finalized state 410.

Figure 5:
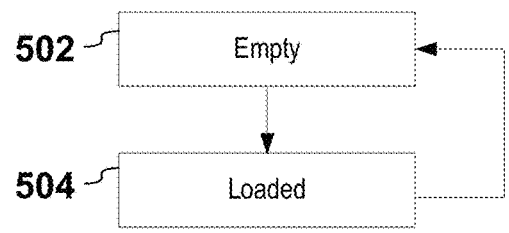
FIG. 5 illustrates an example of states for a container smart contract.

FIG. 5 Illustrates an example of states for the container smart contract 130. The container state for the container smart contract may initially be set to an empty state 502. The empty state 502 may represent a container not including any items. The container smart contract 130 may be set to the empty state 502 when the container tracking label 118 is first created and/or assigned to the container.

The container state may transition to the loaded state 504 when the container receives one or more physical items. For example, the SCI controller 108 may receive a packing request indicative of the physical item 112 being packed in the container 114. The SCI controller 108 may access the container smart contract 130 and execute packing logic of the container smart contract 130. The packing logic generates an item-container mapping. The item-container mapping may indicate a mapping between the container smart contract 130 and the item smart contract 128.

The container state may transition back to the empty state 502 when the container 114 is empty. For example, the SCI controller 108 may receive an unpacking request indicative of the physical item 112 being unpacked from the container 114. The SCI controller 108 may access the container smart contract 130 and execute the packing logic. The packing logic may store transition on the blockchain 104 indicative of the container smart contract 130 being unmapped from the item smart contract 128. Since the item-container mapping of the container smart contract 130 reflects the latest blockchain 104 information, the item-container mapping may no longer indicate that the item smart contact is mapped to the container smart contract 130. The packing logic may store state transition information on the blockchain 104 indicative of the item state being set to the empty state 502.

FIG. 6 illustrates an example of a graphical user interface 602 for a blockchain 104 integrated supply chain. The graphical user interface 602 may display current item information 604 related to the physical item 112. The current item information 604 may include latest information stored on the blockchain 104 related to the physical item 112 and/or containers that shipped the physical item 112. For example, the current item information may include one or more of the latest parameters stored on the blockchain 104 for an item smart contract 128. As illustrated in FIG. 6, the current item information displayed on the graphical user interface includes, among other information, item identifier information, item state information, environmental state information, location information, container information, etc.

The graphical user interface may include a custodial history 604 for the physical item 112. The custodial history 604 may include a sequence of custodian symbols 606. The custodian symbols 606 may represent custodians that took possession of the physical item 112. In proximity to each custodian symbols, the graphical user interface may include historical updates to the item smart contract 128 and/or the container smart contract 130. For example, the graphical user interface may historical custodian information and/or historical item states of the item smart contract 128 that were stored on the blockchain 104 while the custodian had position of the physical item 112 and/or the container 114.

In other examples, the graphical user interface 603 may include other current and/or historical information related to the item smart contract 128 and/or the container smart contract 130.

Figure 7:
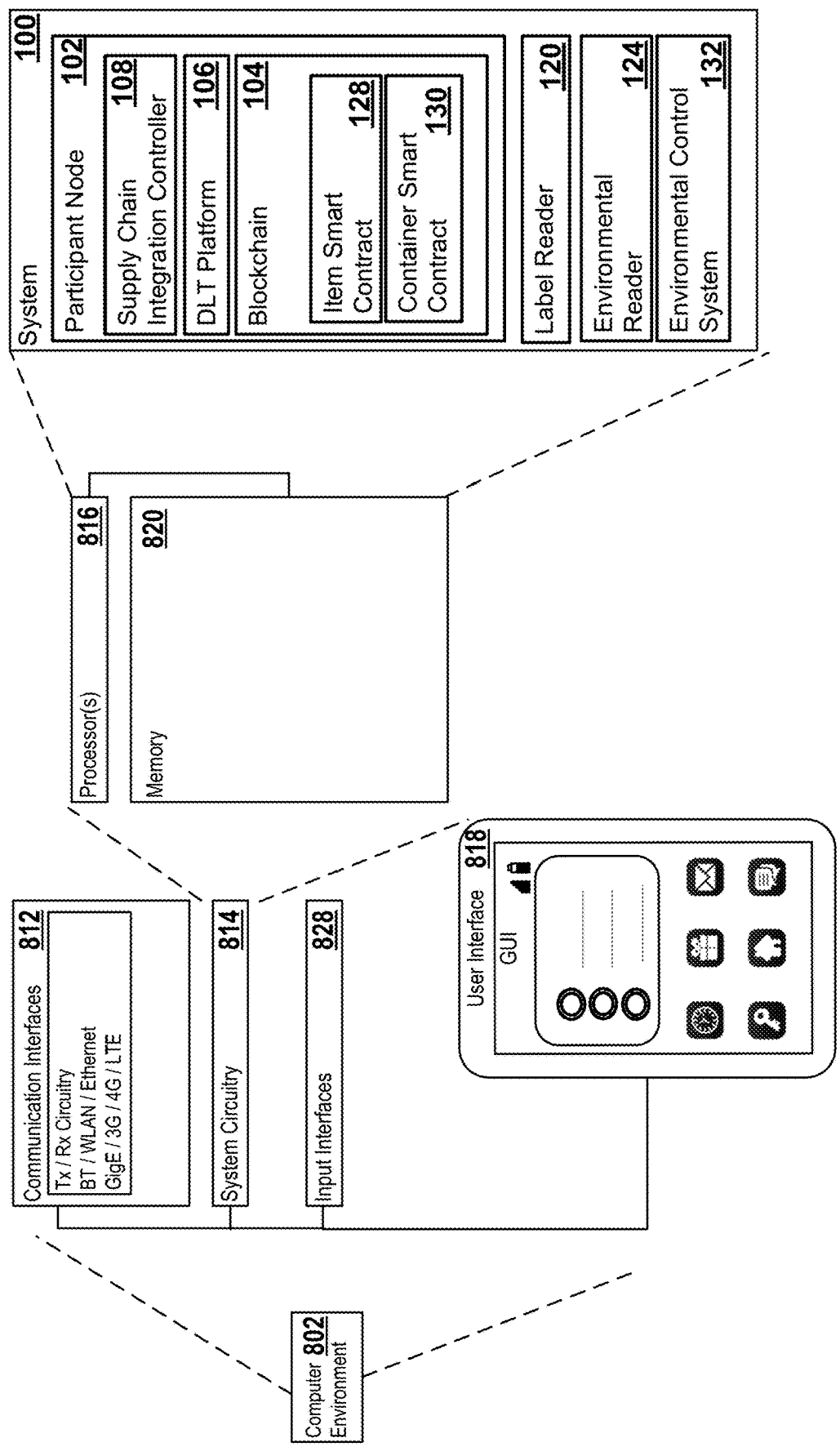
FIG. 7 illustrates an example of a computer environment.

FIG. 7 illustrates an example of a computer environment 802. The computer environment 802 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations of the participant node 102, the blockchain 104, the DLT platform 106, the SCI controller 108, the label reader 120, the environmental reader 124, the environmental control system, the item smart contract 128, the container smart contract 130, and/or the system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include the participant node 102, the blockchain 104, the DLT platform 106, the SCI controller 108, the label reader 120, the environmental reader 124, the environmental control system, the item smart contract 128, the container smart contract 130, and/or the system 100. Alternatively or in addition, the memory may include any other component or sub-component of the system described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the computer environment 802 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The computer environment 802 and/or the system may be implemented in many different ways. In some examples, the system may be implemented with one or more logical components. For example, the logical components of the system may be hardware or a combination of hardware and software. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the participant node 102, the blockchain 104, the DLT platform 106, the SCI controller 108, the label reader 120, the environmental reader 124, the environmental control system, the item smart contract 128, the container smart contract 130, and/or the system 100. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations. The appendix included with this disclosure provide additional, alternative, and/or further elaborative examples of the systems and methods described herein and is part of this specification.

What is claimed is:

1. A method, comprising:
receiving a packing message indicating a physical item resides in a container;
in response to receipt of the packing message:
identifying, on a blockchain, an item smart contract corresponding to the physical item, the item smart contract comprising environmental compliance criteria, item state, and item packing logic for generating mappings between the item smart contract and container smart contracts,
identifying, on the blockchain, a container smart contract corresponding to the container, the container smart contract comprising a container state, and environmental tracking logic for receiving, processing, and storing environmental measurements for the container on the blockchain,
transitioning the container state from an empty state to a loaded state in the container smart contract on the blockchain, and
invoking the item packing logic of the item smart contract to transition the item state from a created state to a packed state in the item smart contract on the blockchain, and to generate, and store on the blockchain, a mapping between the item smart contract and the container smart contract, the mapping indicating the physical item resides in the container;
receiving environmental status information including an environmental measurement,
the environmental status information received from sensor data generated by a sensor on or in the container;
storing, by the environmental tracking logic, the environmental measurement in the container smart contract on the blockchain; and
in response to the item smart contract being mapped to the container smart contract and receipt of the environmental status information:
determining the environmental status information for the container does not satisfy the environmental compliance criteria included in the item smart contract,
transitioning the item state from the packed state to an out of compliance state indicating the environmental compliance criteria not being satisfied,
generating, in response to the environmental compliance criteria not being satisfied, an instruction to an environmental control system to cause adjustment of an environmental condition outside the container, an environmental condition inside the container, or a combination thereof, and
transmitting the instruction to the environmental control system.

2. The method of claim 1, further comprising:
generating a notification message comprising the item state in response to the environmental compliance criteria not being satisfied; and
transmitting the notification message over a network based on a recipient address included in the container smart contract, the item smart contract, or a combination thereof.

3. The method of claim 1, further comprising:
receiving label information encoded in a tracking label affixed to the container;
generating the container smart contract, the container smart contract further comprising the label information; and
storing the container smart contract on the blockchain.

4. The method of claim 1, further comprising:
receiving label information encoded in an RFID affixed to the physical item;
generating the item smart contract, the item smart contract further comprising the label information; and
storing the item smart contract on the blockchain.

5. The method of claim 1, wherein determining the environmental status information for the container does not satisfy the environmental compliance criteria included in the item smart contract further comprises:
accessing environmental compliance logic included in the item smart contract; and
executing the environmental compliance logic to determine the environmental status information for the container does not satisfy the environmental compliance criteria included in the item smart contract.

6. The method of claim 1, wherein the environmental status information includes measurement of an environmental condition inside of the container, an environmental condition outside of the container, or a combination thereof.

7. A system comprising:
a processor circuitry, the processor circuitry configured to:
obtain an item identifier for a physical item and a container identifier for a container;
identify, on a blockchain, an item smart contract based on the item identifier, the item smart contract comprising environmental compliance criteria for the physical item, item state, and item packing logic for generating mappings between the item smart contract and container smart contracts;
identify, on the blockchain, a container smart contract based on the container identifier, the container smart contract comprising container packing logic, and environmental tracking logic for receiving, processing, and storing environmental measurements for the container on the blockchain;
invoke the item packing logic of the item smart contract to transition the item state from a created state to a packed state in the item smart contract on the blockchain, and to generate, and store on the blockchain, a mapping between the item smart contract and the container smart contract, the mapping indicating the physical item resides in the container;
receive environmental status information including an environmental measurement, the environmental status information derived from sensor data, the sensor data being previously generated by a sensor affixed to or in the container;
store, by the environmental tracking logic, the environmental measurement in the container smart contract on the blockchain;
determine, in response to receipt of the environmental status information and in response to the item smart contract being mapped to the container smart contract, the environmental status information does not satisfy the environmental compliance criteria included in the item smart contract;
transition the item state from the packed state to an out of compliance state indicating the environmental compliance criteria not being satisfied; and
control, in response to the environmental compliance criteria not being satisfied, an environmental control system to cause adjustment of a temperature outside the container, a temperature inside the container, or a combination thereof,
wherein the processor circuitry is further configured to:
receive an unpacking message indicating the physical item no longer resides in the container; and
in response to receipt of the unpacking message:
invoke the container packing logic in the container smart contract to store, on the blockchain, a transition indicating the container smart contract being unmapped from the item smart contract.

8. The system of claim 7, wherein the processor circuitry is further configured to:
receive a first set of label information detected by a label reader, the first set of label information being encoded in a first tracking label on or in the item;
extract the item identifier from the first set of label information;
receive a second set of label information detected by the label reader, the second set of label information being encoded in a second tracking label on or in the container; and
extract the container identifier from the second set of label information.

9. The system of claim 8, wherein the first tracking label comprises a first radio-frequency identification (RFID) tag and the second tracking label comprises a second RFID tag.

10. The system of claim 7, wherein to determine the environmental status information for the container does not satisfy the environmental compliance criteria included in the item smart contract, the processor circuitry is further configured to:
execute environmental compliance logic included in the item smart contract wherein execution of the environmental compliance logic causes the processor circuitry to:
compare an environmental measurement included in the environmental status information with a predetermined threshold included in the environmental compliance criteria, and
determine, based on comparison of the environmental measurement with the predetermined threshold, that the environmental compliance criteria is not satisfied.

11. The system of claim 7, wherein the environmental status information includes a measurement of an environment condition inside of the container, an environment condition outside of the container, a temperature of the container, a temperature of the physical item, or a combination thereof.

12. A non-transitory computer readable storage medium comprising:
a plurality of instructions accessible by a processor, the instructions comprising:
instructions executable by the processor to receive an item identifier for a physical item and a container identifier for a container;
instructions executable by the processor to identify, on a blockchain, an item smart contract based on the item identifier, the item smart contract comprising environmental compliance criteria for the physical item, item state, and item packing logic for generating mappings between the item smart contract and container smart contracts;

instructions executable by the processor to identify, on the blockchain, a container smart contract based on the container identifier, the container smart contract comprising container packing logic, and environmental tracking logic for receiving, processing, and storing environmental measurements for the container on the blockchain;

instructions executable by the processor to invoke the item packing logic of the item smart contract to transition the item state from a created state to a packed state in the item smart contract on the blockchain, and to generate, and store on the blockchain, a mapping between the item smart contract and the container smart contract, the mapping indicating the physical item resides in the container;

instructions executable by the processor to receive environmental status information including an environmental measurement, the environmental status information derived from sensor data, the sensor data being previously generated by a sensor affixed to or in the container;

instructions executable by the processor to invoke the environmental tracking logic to store the environmental measurement in the container smart contract on the blockchain;

instructions executable by the processor to determine, in response to receipt of the environmental status information and in response to the item smart contract being mapped to the container smart contract, the environmental status information for the container does not satisfy the environmental compliance criteria included in the item smart contract;

instructions executable by the processor to transition the item state from the packed state to an out of compliance state indicating the environmental compliance criteria not being satisfied;

instructions executable by the processor to control, in response to the environmental compliance criteria not being satisfied, an environmental control system to cause adjustment of a temperature outside the container, a temperature inside the container, or a combination thereof;

instructions executable by the processor to receive an unpacking message indicating the physical item no longer resides in the container; and instructions executable by the processor to invoke, in response to receipt of the unpacking message, the container packing logic in the container smart contract to store, on the blockchain, a transition indicating the container smart contract being unmapped from the item smart contract.

13. The non-transitory computer readable storage medium of claim 12, wherein the instructions accessible by the processor further comprise:

instructions executable by the processor to receive a first set of label information detected by a label reader, the first set of label information being encoded in a first tracking label on or in the item;

instructions executable by the processor to extract the item identifier from the first set of label information;

instructions executable by the processor to receive a second set of label information detected by the label reader, the second set of label information being encoded in a second tracking label on or in the container; and instructions executable by the processor to extract the container identifier from the second set of label information.

14. The non-transitory computer readable storage medium of claim 12, wherein the instructions accessible by the processor further comprise:

instructions executable by the processor to generate a notification message comprising the item state in response to the environmental compliance criteria not being satisfied; and instructions executable by the processor to transmit the notification message over a network based on a recipient address included in the container smart contract, the item smart contract, or a combination thereof.

15. The non-transitory computer readable storage medium of claim 12, wherein the instructions accessible by the processor further comprise:

instructions executable by the processor to receive label information encoded in a tracking label on or in the container;

instructions executable by the processor to generate the container smart contract, the container smart contract further comprising the label information; and instructions executable by the processor to store the container smart contract on the blockchain.

16. The non-transitory computer readable storage medium of claim 12, wherein the instructions accessible by the processor further comprise:

instructions executable by the processor to receive label information encoded in a tracking label affixed to the physical item;

instructions executable by the processor to generate the item smart contract, the item smart contract further comprising the label information; and instructions executable by the processor to store the item smart contract on the blockchain.

17. The method of claim 1, wherein the container smart contract further comprises custody tracking logic, the method further comprising invoking the custody tracking logic in the container smart contract to update custody history, stored on the blockchain, of the item smart contract mapped with the container smart contract.

18. The method of claim 1, wherein the item smart contract further comprises environmental compliance logic, the method further comprising, in response to the item smart contract being mapped to the container smart contract and receipt of the environmental status information, invoking the environmental tracking logic in the container smart contract to cause execution of the environmental compliance logic in the item smart contract to determine whether the environmental status information satisfies the environmental compliance criteria in the item smart contract.

19. The method of claim 1, wherein the container smart contract further comprises container packing logic, the method further comprising:

receiving an unpacking message indicating the physical item no longer resides in the container; and in response to receipt of the unpacking message:

invoking the container packing logic in the container smart contract to store, on the blockchain, a transition indicating the container smart contract being unmapped from the item smart contract.

\* \* \* \* \*